(12) United States Patent
Matsumoto et al.

(10) Patent No.: US 7,645,120 B2
(45) Date of Patent: Jan. 12, 2010

(54) FLOW-GUIDING MEMBER UNIT AND ITS PRODUCTION METHOD

(75) Inventors: Keizo Matsumoto, Saitama-ken (JP); Yasuhisa Tateoka, Saitama-ken (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 104 days.

(21) Appl. No.: 11/905,345

(22) Filed: Sep. 28, 2007

(65) Prior Publication Data
US 2008/0038113 A1 Feb. 14, 2008

Related U.S. Application Data

(63) Continuation-in-part of application No. 11/407,278, filed on Apr. 20, 2006.

(30) Foreign Application Priority Data
Apr. 27, 2005 (JP) ............................. 2005-129621

(51) Int. Cl.
*F01D 9/04* (2006.01)

(52) U.S. Cl. .................. 415/191; 415/211.2; 415/200; 29/889.22

(58) Field of Classification Search ................ 415/183, 415/185, 191, 209.4, 200; 416/230, 241; 29/889.22, 889.21
See application file for complete search history.

(56) References Cited

FOREIGN PATENT DOCUMENTS
JP 2003-214400 7/2003

*Primary Examiner*—Ninh H Nguyen
(74) *Attorney, Agent, or Firm*—Squire, Sanders & Dempsey, L.L.P.

(57) ABSTRACT

A flow-guiding member unit used for assembling a flow-guiding member comprising pluralities of vanes, an outer platform and an inner platform, the unit comprising an integral body member comprising one vane portion, an outer platform portion, and an inner platform portion, a first elastic member attached to a step of the outer platform portion, and a second elastic member attached to a step of the inner platform portion, the body member being formed by the thermal compression of sheet-molding compounds or fiber-reinforced resin pellets, and the first and second elastic members being made of a thermoplastic elastomer.

13 Claims, 11 Drawing Sheets

FLOW-GUIDING MEMBER UNIT AND ITS PRODUCTION METHOD

CROSS REFERENCE TO RELATED APPLICATIONS

This is a continuation-in-part application of U.S. patent application Ser. No. 11/407,278, filed Apr. 20, 2006 and claims priority from Japanese Application No. 2005-129621 filed Apr. 27, 2005 the contents which are incorporated herein.

FIELD OF THE INVENTION

The present invention relates to a flow-guiding member unit used for assembling a flow-guiding member and its production method, particularly to a flow-guiding member unit having sufficient mechanical strength and light in weight, and a method for producing such a flow-guiding member unit at a low cost.

BACKGROUND OF THE INVENTION

Flow-guiding members for gas turbine engines, etc. are widely used for aircrafts, electric generators, etc. For instance, gas turbine engines for aircrafts are provided with stator vanes acting to guide the introduced air to rotor vanes and working as outlet guide vanes for guiding a bypass flow. The stator vanes are generally made of metal materials such as titanium alloys, aluminum alloys, stainless steel, etc. The metal stator vanes are produced by forming pluralities of vanes by casting, forging, pressing, etc., and bonding each vane to a casing called a platform by welding or brazing, etc.

However, the above conventional production methods need machining, finishing, coating, etc. after the formation of vanes, resulting in a large number of working steps and difficulty in working of small complicated parts. In addition, the flow-guiding members made of metal materials are disadvantageously heavy and expensive.

Much attention has recently been paid to flow-guiding members made of composite resin materials, because they are light in weight and have satisfactory mechanical strength. A flow-guiding member made of a composite resin material generally has a structure in which among elements constituting the flow-guiding member, only vanes are changed from a metal to the composite resin material. It is produced by bonding units obtained by forming prepregs, etc. to supports one by one by an adhesive, etc., and winding a tape around the assembled units to fix them. However, inevitable dimensional errors of parts make it difficult to assemble the units to a uniform shape by such production method, resulting in difficulty in fixing the units at desired positions, and needing additional steps of winding a tape to fix the units. In addition, even when only one unit is damaged, the entire assembly should inevitably be exchanged because the units are undetachably assembled.

In such circumstances, the inventors previously proposed a flow-guiding member unit having an integral structure comprising one vane, an outer platform piece, and an inner platform piece, which is constituted by (a) a core comprising a web portion constituting the vane, and flanges integrally connected to both ends of the web portion to constitute the outer platform piece and the inner platform piece, and (b) a skin layer covering the core, the skin layer being made of a thermosetting resin having rubber or rubber elasticity (JP2003-214400A). To produce this flow-guiding member unit, for instance, a prepreg laminate is heat-pressed, charged into a die together with a liquid thermosetting resin, and the resin is cured.

Because the flow-guiding member unit having a skin layer made of a thermosetting resin has enough elasticity, it can be formed into a flow-guiding member without needing to wind a tape around it. Accordingly, when the flow-guiding member formed by the flow-guiding member units produced by this method are damaged, only damaged units can be exchanged to new ones. However, to produce flow-guiding member units having excellent mechanical strength, the prepreg laminate should be formed by cutting the prepregs to predetermined shapes and laminating them, with the directions of fibers taken into consideration. This operation requires such high skills that only skilled artisans can produce the laminate, taking an extremely long period of time and a high cost.

OBJECTS OF THE INVENTION

Accordingly, an object of the present invention is to provide a flow-guiding member unit made of a composite resin material having sufficient mechanical strength, easily exchangeable after assembled to a flow-guiding member, and producible at a low cost, and its production method.

DISCLOSURE OF THE INVENTION

As a result of intense research in view of the above object, the inventors have found that by forming a flow-guiding member unit body by the thermal compression of sheet-molding compounds or fiber-reinforced resin pellets such that it has steps in outer and inner platforms, and attaching elastic members made of a thermoplastic elastomer to the steps, flow-guiding member units easily exchangeable at any position in a flow-guiding member produced by assembling the units can be produced easily at a low cost. The present invention has been completed based on such finding.

Thus, the flow-guiding member unit of the present invention used for assembling a flow-guiding member comprising pluralities of vanes, an outer platform and an inner platform comprises an integral body member comprising one vane portion, an outer platform portion, and an inner platform portion, a first elastic member attached to a step of the outer platform portion, and a second elastic member attached to a step of the inner platform portion, the body member being formed by the thermal compression of sheet-molding compounds or fiber-reinforced resin pellets.

A front edge of the vane portion is preferably covered with a protective member. The sheet-molding compounds is preferably composed of reinforcing fibers having an average length of 60 mm or less, and a thermosetting resin and/or a thermoplastic resin. The fiber-reinforced resin pellets are composed of reinforcing fibers having an average length of 60 mm or less and a thermoplastic resin, the reinforcing fibers being oriented in one direction in the fiber-reinforced resin pellets. The body member preferably comprises a core member.

The method of the present invention for producing a flow-guiding member unit comprising an integral body member comprising one vane portion, a outer platform portion and an inner platform portion, which is used for assembling a flow-guiding member comprising pluralities of vanes, an outer platform and an inner platform, comprises compressing sheet-molding compounds or fiber-reinforced resin pellets while heating in a molding die to form the integral body member having steps in the outer platform portion and the inner platform portion, and attaching an elastic member to each step.

The elastic member is preferably made of a thermoplastic elastomer. A front edge of the vane portion is preferably covered with a protective member. The protective member is preferably made of a metal. When the sheet-molding compounds or the fiber-reinforced resin pellets are introduced into the molding die, a core member is preferably placed in the molding die such that it is sandwiched by the sheet-molding compounds or the fiber-reinforced resin pellets.

DESCRIPTION OF THE PREFERRED EMBODIMENTS

Figure 1:
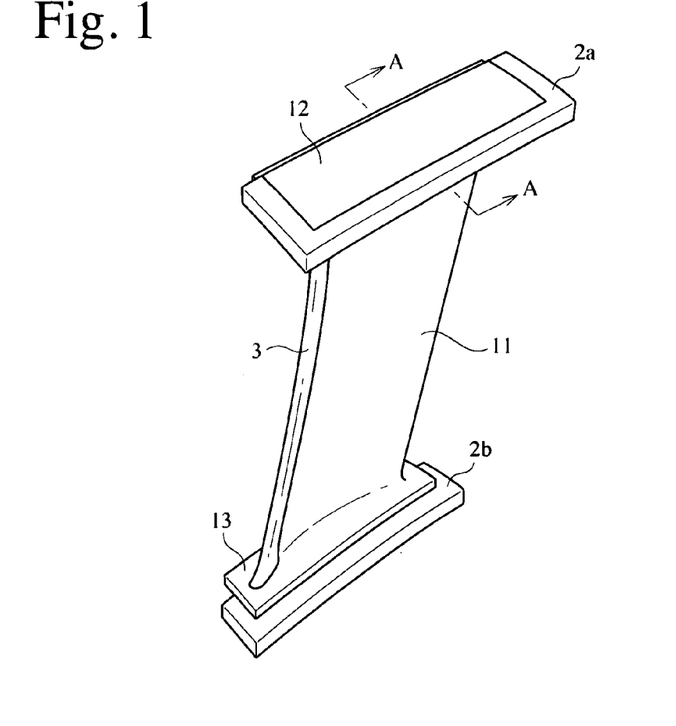
FIG. 1 is a perspective view showing one example of the flow-guiding member unit of the present invention.
Figure 3:
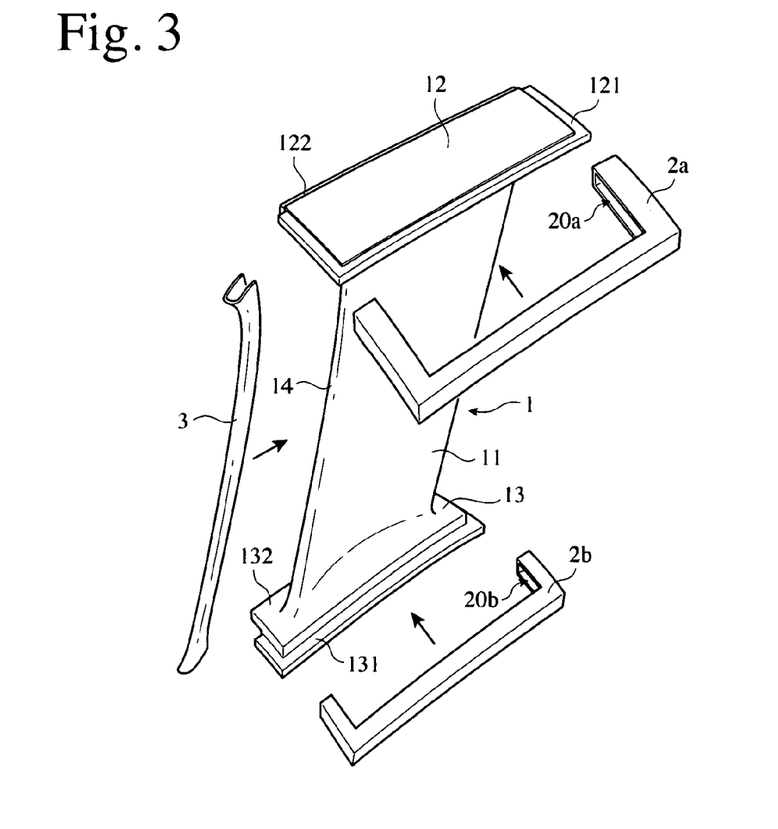
FIG. 3 is an exploded view of the flow-guiding member unit shown in FIG. 1.
Figure 4:
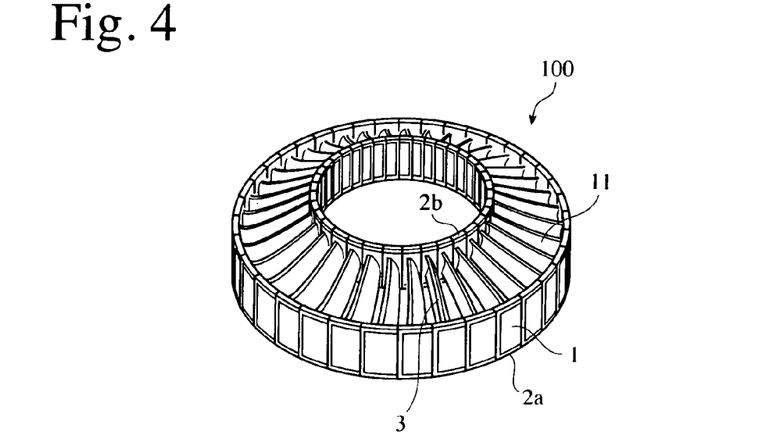
FIG. 4 is a perspective view showing one example of the flow-guiding member constituted by the flow-guiding member units of the present invention.

FIG. 1 shows one example of the flow-guiding member unit of the present invention. Although the flow-guiding member unit shown in FIG. 1 is in a substantially I shape, it is not restricted to the I shape, but may be in a C or Z shape. As shown in FIG. 1, the flow-guiding member unit comprises a planar vane 11, an outer platform portion 12 formed at an outer end of the vane 11, and an inner platform portion 13 formed at an inner end of the vane 11. As shown in FIG. 3, U-shaped elastic members 2a, 2b are attached to the outer platform portion 12 and the inner platform portion 13, respectively, and a protective member 3 is attached to the vane 11. As shown in FIG. 4, the connection of pluralities of flow-guiding member units forms a flow-guiding member 100 comprising pluralities of vanes and annular outer and inner platforms.

Figure 2:
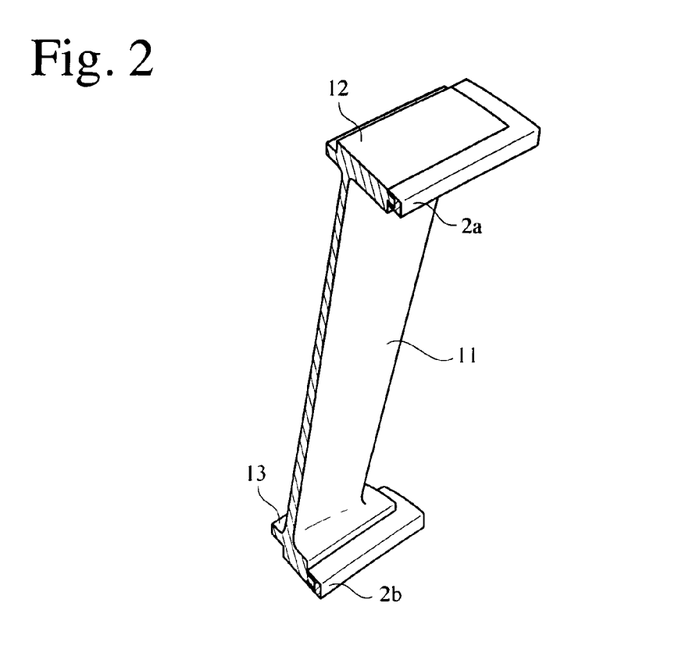
FIG. 2 is a partially cross-sectional, perspective view taken along the line A-A in FIG. 1.

The vane 11 is a slightly curved plate, and the outer platform portion 12 and the inner platform portion 13 are substantially perpendicular to the vane 11. As shown in FIG. 2, the body member 1 comprising the outer platform portion 12 and the inner platform portion 13 has a substantially I-shaped cross section. As shown in FIG. 3, each of the outer platform portion 12 and the inner platform portion 13 has a step 121, 131 extending in a U shape (simply called "U-shaped step"), and a linearly extending step 122, 132 (simply called "linear step").

The body member 1 is integrally formed by sheet-molding compounds (hereinafter referred to as "SMCs") or fiber-reinforced resin pellets. The SMC is a sheet-shaped resin composite comprising reinforcing fibers having an average length of 60 mm or less dispersed in a resin composition comprising a resin component and additives. The SMC is preferably as thick as 0.5 to 2 mm, about 25 to 100% of the thickness of the vane. The resin component of the SMC is not particularly restrictive. Specific examples of the resins include thermosetting resins such as unsaturated polyesters, epoxy resins, polyimides, silicone resins, phenol resins, etc. Preferable among them are unsaturated polyesters and epoxy resins. The SMC may contain various thermoplastic polymers.

The average length of the reinforcing fibers is 60 mm or less, preferably 5 to 51 mm, more preferably 25 to 51 mm. In the range of 60 mm or less in the average length of the reinforcing fibers, the larger the average length, the larger mechanical strength the body member 1 tends to have. Even if the average length of the reinforcing fibers is more than 60 mm, substantially no improvement in mechanical strength can be obtained, resulting in poor moldability and a high cost. When the average length of the reinforcing fibers in the SMC is less than 5 mm, the resultant flow-guiding member unit has too small strength. Materials for the reinforcing fibers are not particularly restrictive. Preferred examples of the reinforcing fibers include carbon fibers, boron fibers, glass fibers, organic fibers and their mixtures. Particularly carbon fibers are preferable to form lightweight, thin, flow-guiding member units, because they are lighter than the other fibers. The reinforcing fibers preferably have diameters of 3 to 200 μm, more preferably 6 to 20 μm. The reinforcing fibers preferably have a tensile strength of 3000 MPs or more and a tensile modulus of 200 GPa or more.

The amount of the reinforcing fibers in the SMC is determined such that the reinforcing fibers are 10 to 60% by volume of the body member 1. When the amount of the reinforcing fibers is less than 10% by volume, the formed body member 1 has too small mechanical strength. On the other hand, when the SMC containing more than 60% by volume of reinforcing fibers is used, it has poor moldability, and the formed body member 1 has low toughness. The amount of reinforcing fibers in the SMC is more preferably 50 to 60% by volume. The SMC may contain additives such as curing agents (polymerization initiators), curing catalysts, parting agents, viscosity-increasing agents, coloring agents, fillers, etc. The curing agents may be azo compounds and peroxides, the curing catalysts may be mercaptans, the parting agents may be higher aliphatic acids such as stearic acid and their metal salts, and the viscosity-increasing agents may be alkaline earth metal oxides.

The fiber-reinforced resin pellets comprises a thermoplastic resin and reinforcing fibers. The types of the thermoplastic resin and the reinforcing fibers are not particularly restrictive. Preferred examples of the thermoplastic resins include polyetheretherketone (PEEK), polyamides such as nylons, etc., polyimides, polyesters such as polyethylene terephthalate, polybutylene terephthalate, etc., polyacetal, polyphenylene sulfide, polyetherketone, polyolefin resins such as ethylene resins, propylene resins, ethylene-propylene copolymer resins, etc., polystyrene resins, polycarbonate resins, etc. The fiber-reinforced resin pellets may contain two or more thermoplastic resins.

Preferred examples of the reinforcing fibers in the pellets may be the same as in the SMC. The amount of the reinforcing fibers is preferably 10 to 60% by volume, more preferably 40 to 55% by volume, of the body member 1. The fiber-reinforced resin pellets may contain additives such as antioxidants, antistatic agents, dispersants, lubricants, flame retardants, photo-stabilizers, UV absorbers, etc.

Figure 6:
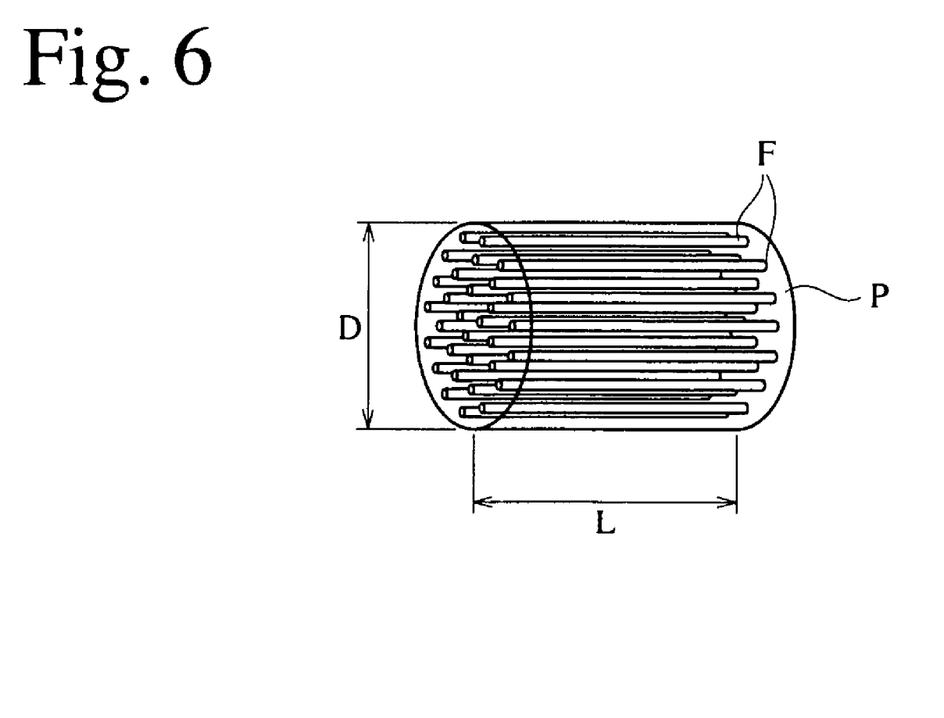
FIG. 6 is a perspective view showing one example of the fiber-reinforced resin pellets.
Figure 7A:
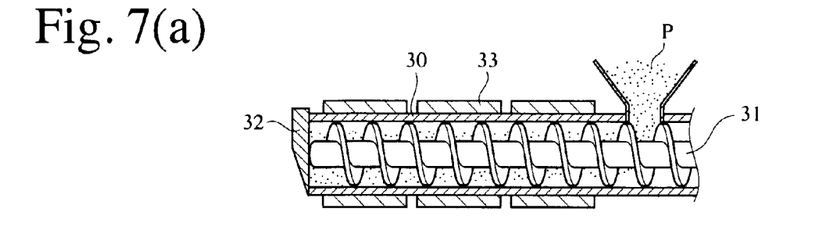
FIG. 7(a) is a cross-sectional view showing one example of the extruder into which fiber-reinforced resin pellets are being charged.
Figure 7B:
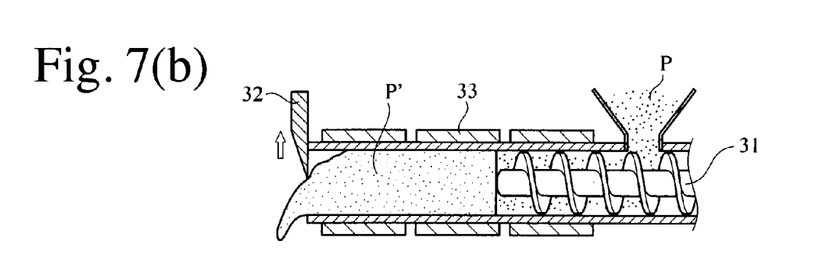
FIG. 7(b) is a cross-sectional view showing a molten fiber-reinforced resin residing in the extruder.
Figure 7C:
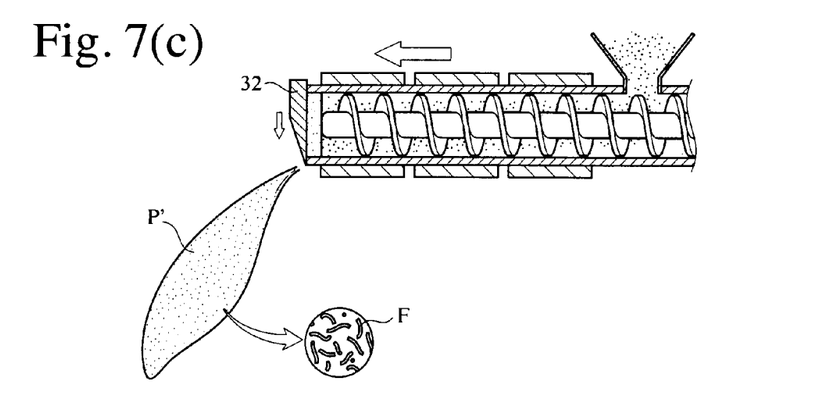
FIG. 7(c) is a cross-sectional view showing a molten fiber-reinforced resin extruded from the extruder.
Figure 7D:
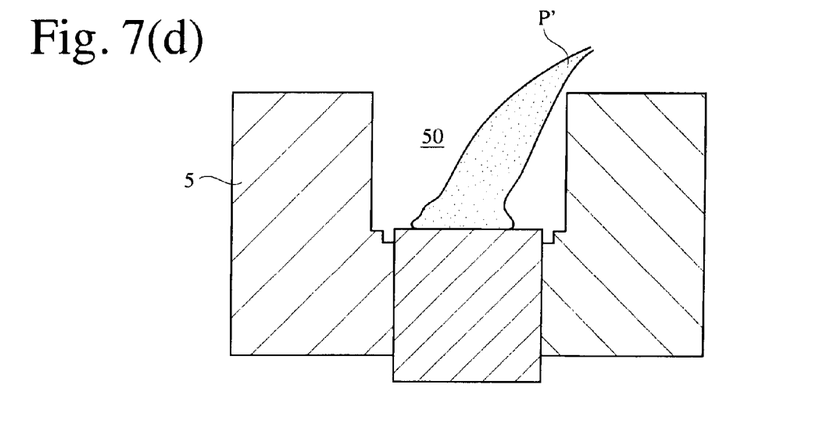
FIG. 7(d) is a cross-sectional view showing a molding die having a cavity into which the molten fiber-reinforced resin is charged.

The pellets may have minimum thickness and length in usual ranges. Specifically, the pellets preferably have a thickness D of about 2 to 5 mm and a length L of about 10 to 51 mm. As shown in FIG. 6, it is preferable that the reinforcing fibers F extend substantially along the longitudinal direction of each fiber-reinforced resin pellet P. The term "substantially parallel" includes not only a case where all reinforcing fibers F are parallel to the longitudinal direction of the pellet P, but also a case where part of the reinforcing fibers F (for instance, 0.1 to 30% by mass) are not parallel, and a case where most reinforcing fibers F (for instance, 70 to 99% by mass) appear to be oriented in parallel therewith. One example of methods for producing fiber-reinforced resin pellets P having such orientation is a method of impregnating reinforcing fiber rovings with a thermoplastic resin, drawing them through a die, and cutting them to a desired length (corresponding to the pellet length). After molding, the reinforcing fibers are randomly oriented in the flow-guiding member unit. The randomly dispersed reinforcing fibers greatly contribute to strengthening the flow-guiding member unit.

Each elastic member 2a, 2b has a recess 20a, 20b for receiving each step 121, 131. The elastic member 2a is attached to the step 121, and the elastic member 2b is attached to the step 131. With the elastic members 2a, 2b attached, the flow-guiding member unit preferably has flat outer and inner end surfaces. As described below, the outer platform portion 12 and the inner platform portion 13 are connected to those of an adjacent flow-guiding member unit. The elastic members 2a, 2b attached to the platforms 12, 13 can absorb dimensional errors, thereby assuring firm assembling to the flow-guiding member 100. Also, the elastic members 2a, 2b can seal gaps between the flow-guiding member 100 and its supporting member.

The elastic members 2a, 2b may be thermoplastic or thermosetting. Specifically, the elastic members 2a, 2b are preferably made of urethane rubbers, silicone rubbers, chloroprene rubbers, or Teflon (registered trademark), more preferably urethane rubbers.

The protective member 3 covers one edge 14 of the vane 11. The edge 14 having the protective member 3 is on the front side of the flow-guiding member 100. With the protective member 3 attached to the front edge 14 requiring the largest strength, the flow-guiding member 100 can be made lighter in weight while imparting sufficient strength to the flow-guiding member units. The protective member 3 may be a metal sheet, an electroformed layer, a paint coating, a thermally sprayed layer, etc. Preferred materials for the metal sheet include stainless steel and Ni-based alloys.

Figure 5A:
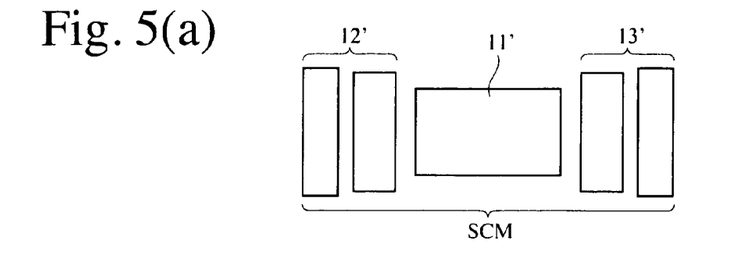
FIG. 5(a) is a plan view showing an SMC cut to pieces corresponding to a vane, an outer platform portion and an inner platform portion in one example of the steps of producing a body portion in the flow-guiding member unit.
Figure 5B:
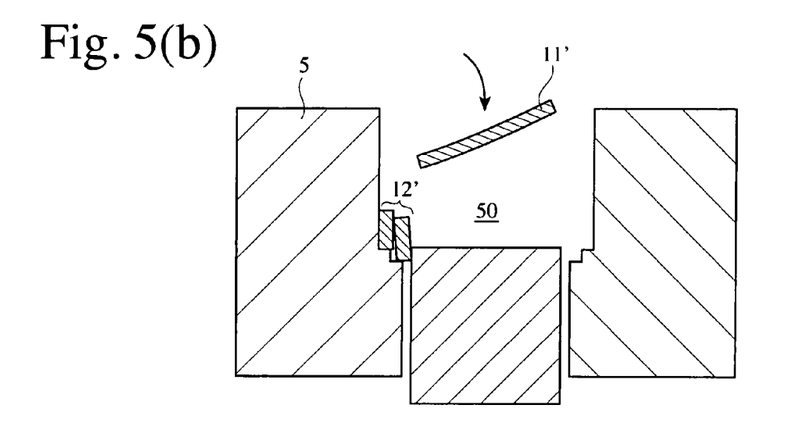
FIG. 5(b) is a cross-sectional view showing a molding die into which the SMC pieces are introduced.
Figure 5C:
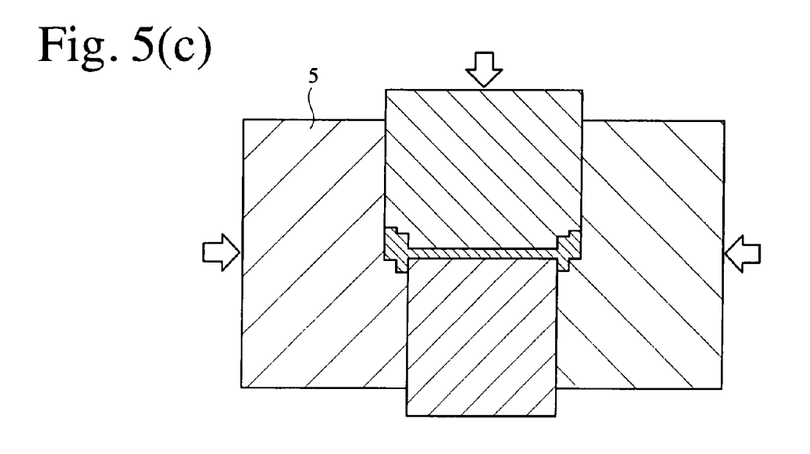
FIG. 5(c) is a cross-sectional view showing the molding die compressing the SMC pieces.
Figure 5D:
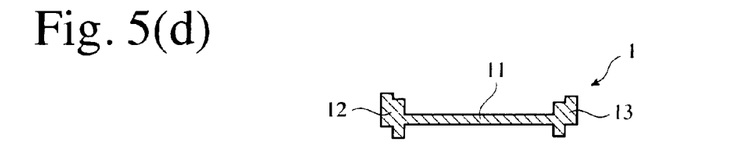
FIG. 5(d) is a cross-sectional view showing the resultant integral body portion. 22

Taking SMC for example, the production method of the flow-guiding member unit will be explained below. As shown in FIG. 5(*a*), the SMC is cut to a piece 11' corresponding to the vane 11, two pieces 12' corresponding to the outer platform portion 12, and two pieces 13' corresponding to the inner platform portion 13. The SMC needs not be cut to exactly the same shapes as the vane 11, etc., but may be cut to shapes near or slightly smaller than those of the vane 11, etc. The SMC may be cut by a cutting knife, etc. The number of SMC pieces charged into a molding die 5 may be determined depending on the thickness of the vane 11, the outer platform portion 12, the inner platform portion 13 and the SMC.

The SMC pieces 11', 12', 13' placed in a cavity 50 of the molding die 5 [FIG. 5(*b*)] are compressed from three directions while heating [FIG. 5(*c*)]. The heating temperature need only be sufficient for the curing of the SMC pieces 11', 12', 13', and it is preferably 100 to 200° C. The compression pressure is preferably 5 to 20 MPa, more preferably 8 to 12 MPa. The compression time with heating is about 10 to 20 minutes. The SMC pieces 11', 12', 13' are integrally formed into the body member 1 by compressing and heating [5(*d*)].

When the fiber-reinforced resin pellets are used, the production method of the body member 1 is substantially the same as in the case of using the SMC. Accordingly, only differences will be explained. The fiber-reinforced resin pellets may be charged into the cavity 50 of the molding die 5 in a solid state or in a molten state. Taking for example a case where a molten fiber-reinforced resin is charged into the cavity 50, the production method of the body member 1 will be explained.

As shown in FIG. 7(*a*), the fiber-reinforced resin pellets P are introduced into an extruder 30 and blended by a screw 31. When a shutter 32 disposed at a tip end of the extruder 30 is closed, the pellets P reside in the extruder 30 [FIG. 7(*b*)]. The fiber-reinforced resin pellets P are melted by a heater 33, and the reinforcing fibers F are randomly oriented in the molten fiber-reinforced resin P' as shown in FIG. 7(*c*). A predetermined amount of the molten fiber-reinforced resin P' is extruded from the extruder 30 [FIG. 7(*c*)], and introduced into the cavity 50 of the molding die 5 [FIG. 7(*d*)]. The cavity 50 is compressed from three directions while heating. Because the temperature of the resin P' is higher than the molding temperature, no heating to higher temperatures is needed, and the cavity 50 need only be heated to ensure molding. The reinforcing fibers randomly dispersed in the body member 1 greatly contribute to strengthening the flow-guiding member unit.

Figure 8A:
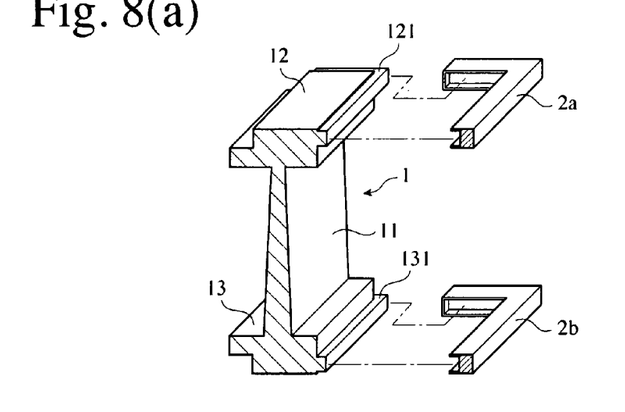
FIG. 8(a) is a partially cross-sectional, perspective view showing a flow-guiding member unit, in which a pair of elastic members are to be attached to an integral body portion.
Figure 8B:
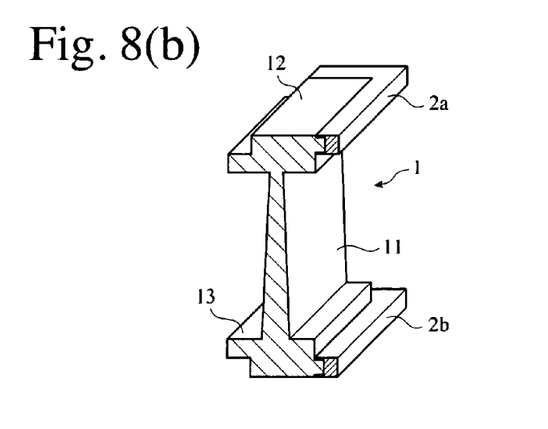
FIG. 8(b) is a partially cross-sectional, perspective view showing the integral body portion to which elastic members are attached.

As shown in FIGS. 8(a) and (b), the elastic members 2a, 2b are attached to the steps 121, 131 of the outer and inner platform portions 12, 13. Because the elastic members 2a, 2b are extendable and shrinkable, the elastic members 2a, 2b can be forced to engage the steps 121, 131. With the protective member 3 attached to the front edge 14, the flow-guiding member unit 1 is completed. The protective member 3 may be bonded to the vane 11 by an adhesive, etc.

Figure 8C:
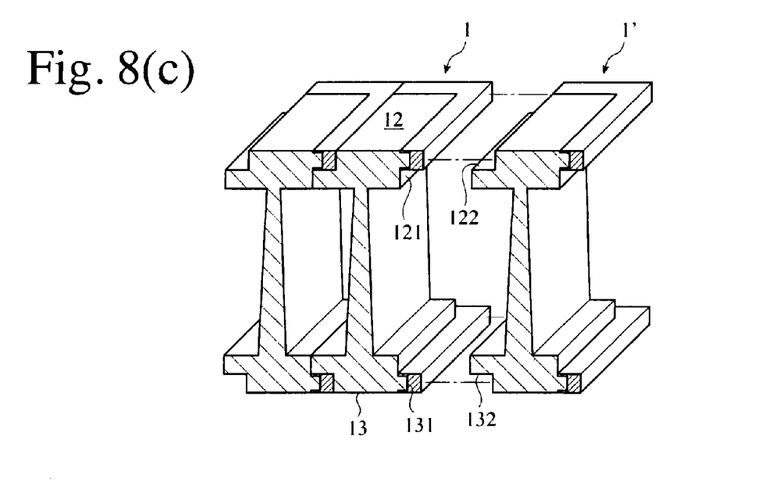
FIG. 8(c) is a partially cross-sectional, perspective view showing flow-guiding member units connected to each other.

The U-shaped steps 121, 131 in the outer platform portion 12 and the inner platform portion 13 of the flow-guiding member unit 1 are engaged with the linear steps 122, 132 of an adjacent flow-guiding member unit 1' as shown in FIG. 8(c), thereby providing a flow-guiding member 100, connected flow-guiding member units 1. Though FIG. 8(c) depicts that the outer platform portions 12 and the inner platform portions 13 constitute linear platforms, they actually form annular platforms. The elastic members 2a, 2b are slightly deformed between the adjacent platforms 12, 13, thereby absorbing the dimensional errors of the flow-guiding member units and sealing the flow-guiding member 100.

Figure 9:
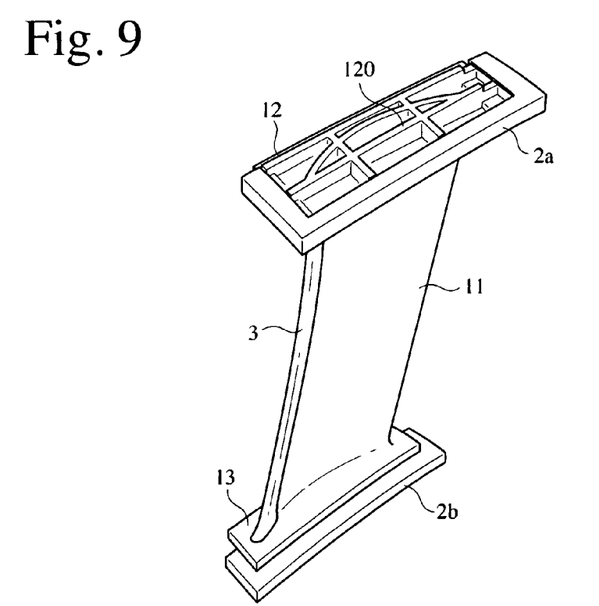
FIG. 9 is a perspective view showing another example of the flow-guiding member unit of the present invention.
Figure 10:
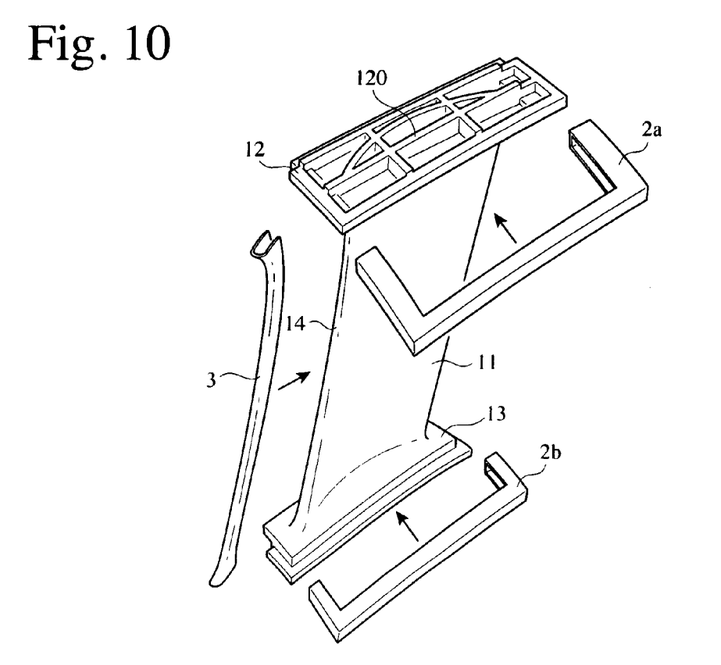
FIG. 10 is an exploded view of the flow-guiding member unit shown in FIG. 9.

FIGS. 9 and 10 show another example of the flow-guiding member unit. Because this flow-guiding member unit is substantially the same as shown in FIGS. 1 to 3, except that the former has an outer platform portion 12 and an inner platform portion 13 with ribs 120, only differences will be explained below. The ribs 120 extend not only in longitudinal and transverse directions of the platforms 12, 13 but also along the vane 11. The flow-guiding member unit having the platforms 12, 13 with the ribs 120 has necessary strength and are light in weight.

Figure 11:
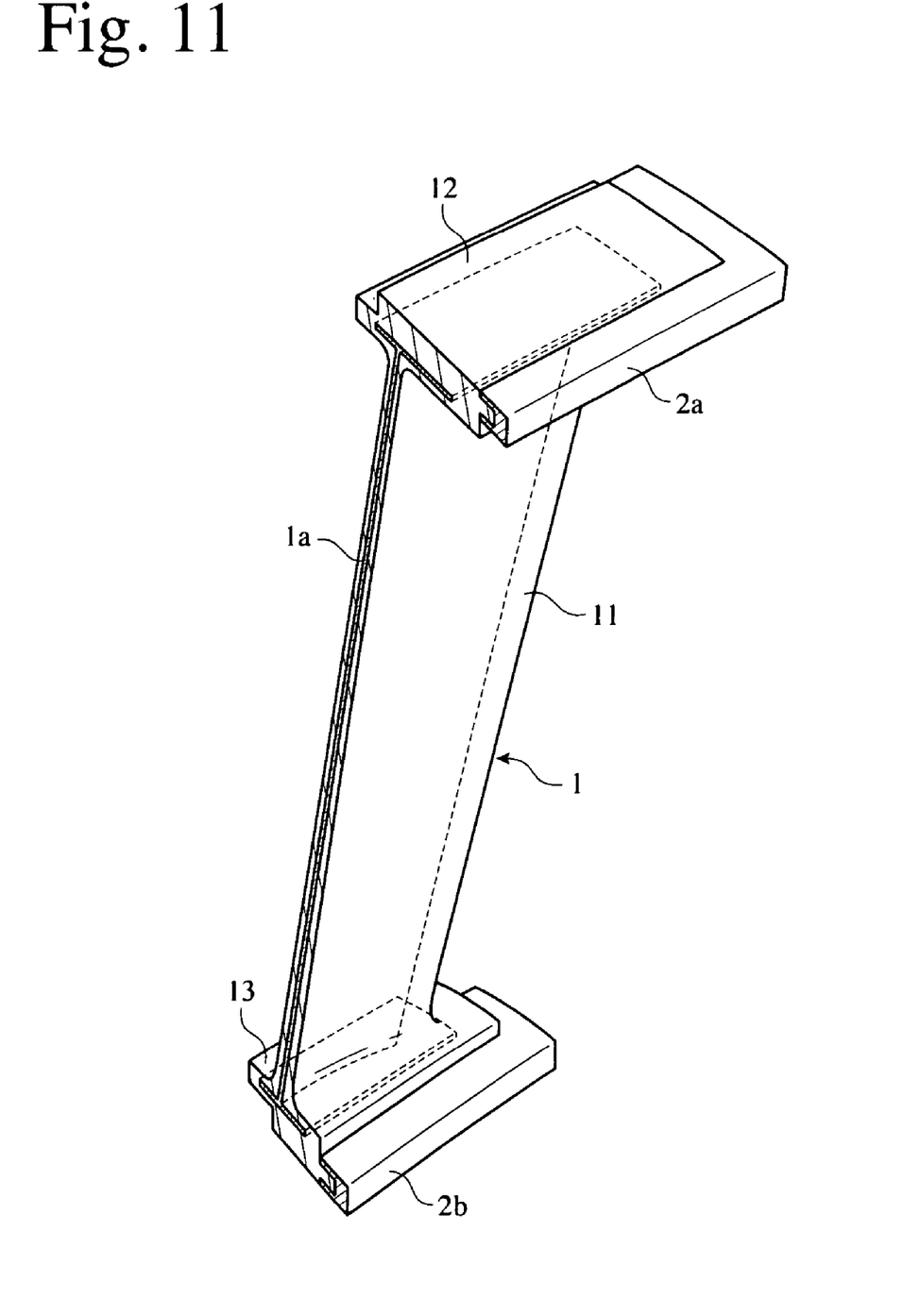
FIG. 11 is a cross-sectional view showing a further example of the flow-guiding member unit of the present invention.

FIG. 11 shows a further example of the flow-guiding member unit of the present invention. Because this flow-guiding member unit is the same as shown in FIG. 1, except that the former comprises a core member 1a in the body member 1, only differences will be explained below. The core member la has an I-shaped cross section. The core member 1a is preferably covered with a hardened SMC. The core member 1a is preferably made of metals, carbon fiber-reinforced plastics (CFRP) or Kevlar fiber-reinforced plastics (KFRP). The flow-guiding member unit comprising the core member 1a made of a metal, etc. has excellent mechanical strength.

Figure 12A:
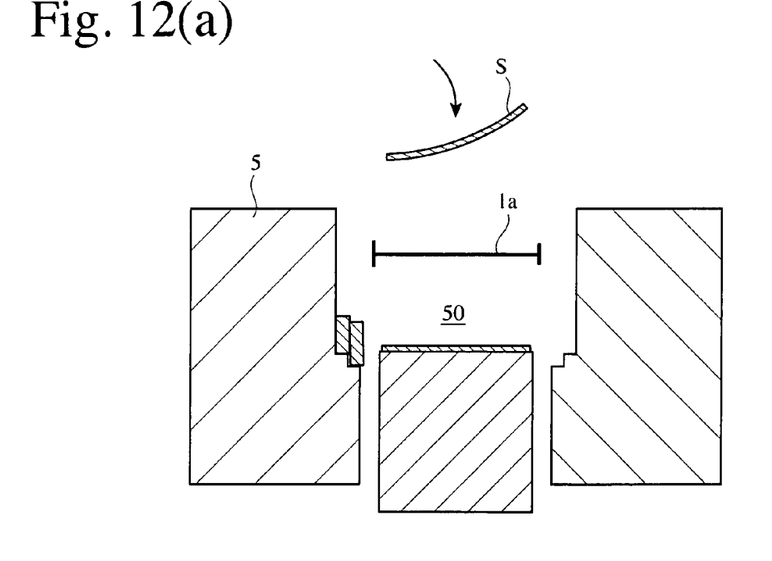
FIG. 12(a) is a cross-sectional view showing a molding die into which SMC pieces are being placed to form the body portion shown in FIG. 11.
Figure 12B:
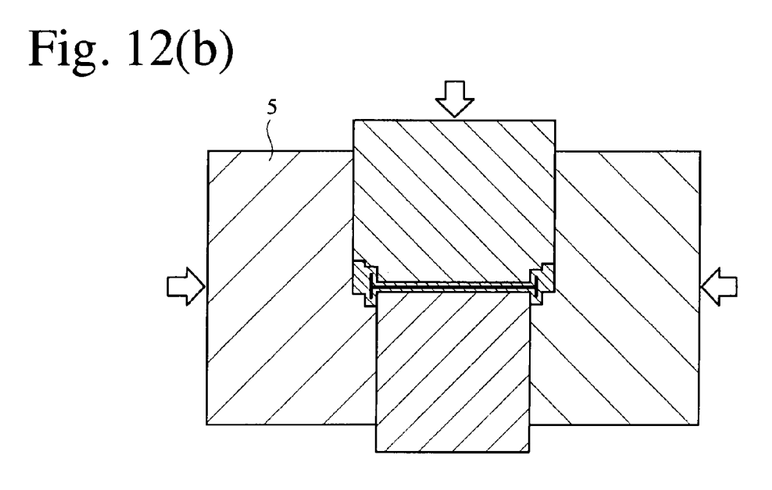
FIG. 12(b) is a cross-sectional view showing the SMC pieces compressed in the molding die.
Figure 12C:
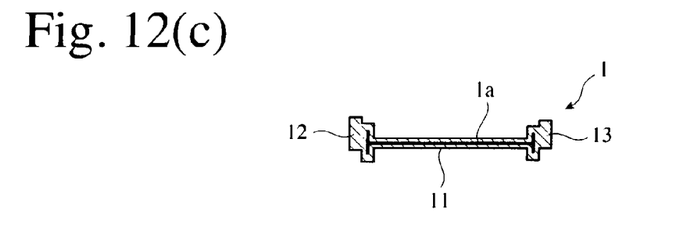
FIG. 12(c) is a cross-sectional view showing the formed body portion.

As shown in FIG. 12(a), the core member 1a formed in advance to have an I-shaped cross section is charged into a cavity 50 of a molding die 5 together with SMC pieces S, such that the core member 1a is sandwiched by the SMC pieces S. Compression from three directions while heating as shown in FIG. 12(b) produces a body member 1 comprising the core member 1a [FIG. 12(c)].

Figure 13:
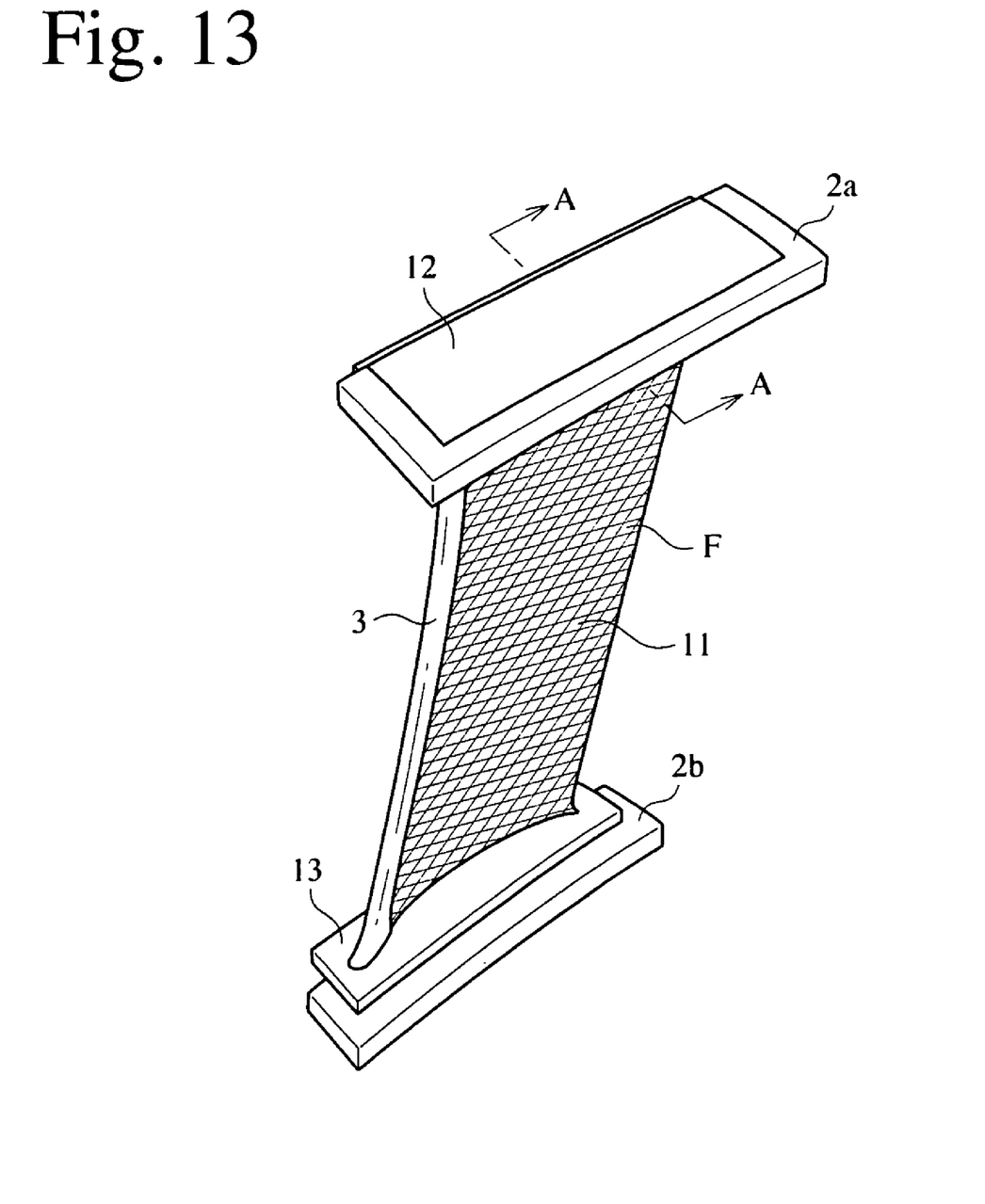
FIG. 13 is a perspective view showing a further example of the flow-guiding member unit of the present invention.

The flow-guiding member unit preferably has a protective member F on each surface of the vane 11 as shown in FIG. 13. Because it is the same as shown in FIG. 1 except for comprising the protective member F, only differences will be explained below. The protective member F is preferably formed by woven or nonwoven fabrics of carbon (graphite) fibers, glass fibers, aramide fibers, etc. The protective member F on the vane surface provides the flow-guiding member unit with higher scratch resistance. The protective member F is effective particularly when formed on fan stator vanes in a jet engine, which highly likely come into contact with foreign matter entering into the engine.

Figure 14A:
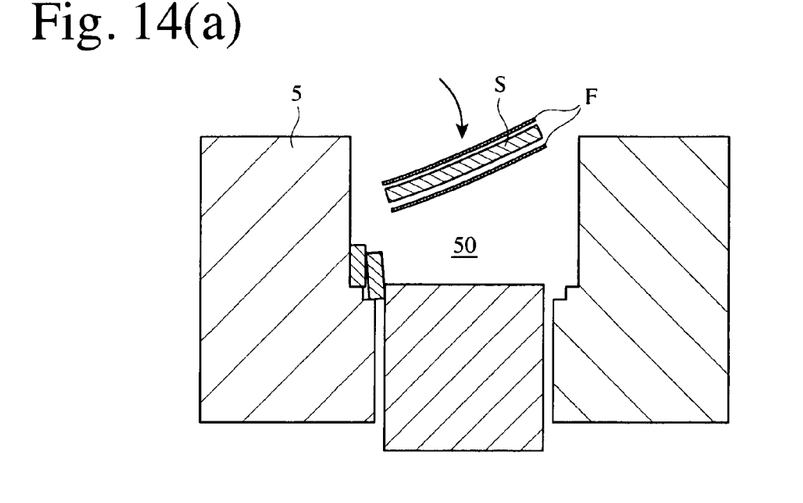
FIG. 14(a) is a cross-sectional view showing a molding die, in which an SMC having protective members on both surfaces are placed in the production of the body member of the flow-guiding member unit shown in FIG. 13.
Figure 14B:
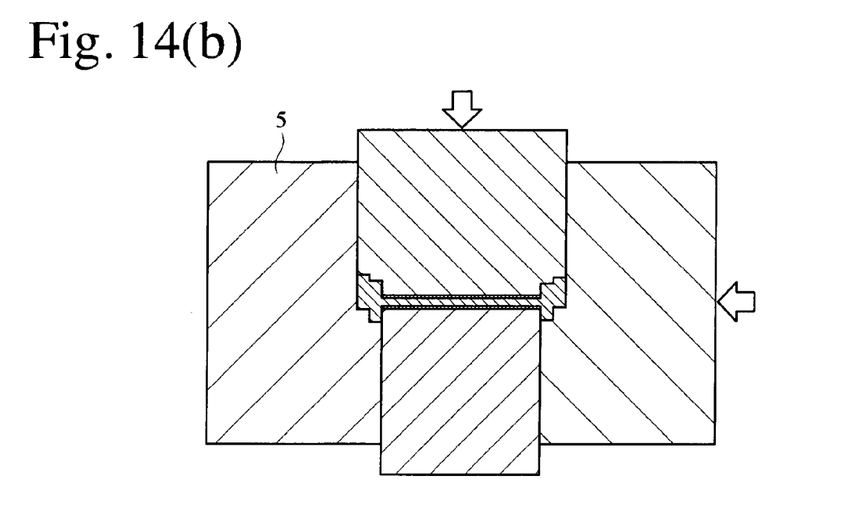
FIG. 14(b) is a schematic view showing a molding die, which is being pressed in the production of the body member of the flow-guiding member unit shown in FIG. 13.
Figure 14C:
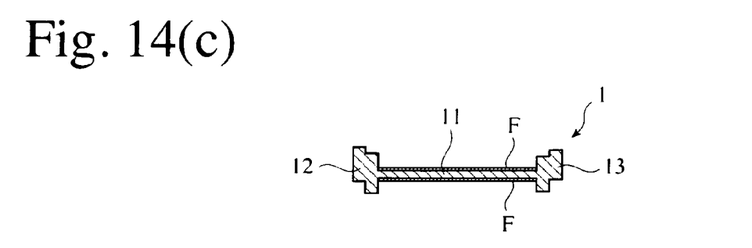
FIG. 14(c) is a cross-sectional view showing the body member of the flow-guiding member unit shown in FIG. 13.

As shown in FIG. 14(a), cut sheet-molding compounds S having woven fabrics of graphite fibers as the protective members F on both surfaces are placed in a cavity 50 of a molding die 5. By pressing the material in the cavity 50 from three directions while heating [FIG. 14(b)], a body member 1 having the protective members F can be obtained [FIG. 14(c)]. Though the woven fabrics of graphite fibers are used as the protective members F in this example, the protective members F usable in the present invention are not restricted thereto.

EFFECT OF THE INVENTION

The flow-guiding member unit of the present invention comprises a body portion formed by the sheet-molding compounds or the fiber-reinforced resin pellets. The body portion constituted by the sheet-molding compounds is obtained simply by charging properly cut sheet-molding compounds into a molding die, and thermally compressing them. The body portion formed by the fiber-reinforced resin pellets is obtained simply by charging a molten fiber-reinforced resin into a molding die, and compressing it. Accordingly, the flow-guiding member unit can be produced extremely easily at a low cost without needing the skill. Also, because it contains dispersed reinforcing fibers, it has sufficient strength.

The outer platform portion and the inner platform portion engageable with those of adjacent units have elastic members made of a thermoplastic elastomer. The elastic members can absorb the dimensional errors of the flow-guiding member unit, thereby preventing the units from moving in the assembled flow-guiding member. Having a body portion formed by sheet-molding compounds or fiber-reinforced resin pellets, with elastic members made of a thermoplastic elastomer attached to connecting platform portions, which should be flexible, the flow-guiding member unit has sufficient mechanical strength and is light in weight. Accordingly, the flow-guiding member unit of the present invention is suitable for flow-guiding members of aircrafts, etc.

What is claimed is:

1. A flow-guiding member unit used for assembling a flow-guiding member comprising a plurality of vanes, an outer platform and an inner platform, said flow-guiding member unit comprising:
    an integral body member comprising
        one vane portion comprising a fabric on each of two surfaces thereof,
        an outer platform portion, and
        an inner platform portion;
    a first elastic member attached to a step of said outer platform portion; and
    a second elastic member attached to a step of said inner platform portion,
    wherein said integral body member comprises one of thermally compressed sheet-molding compounds or fiber-reinforced resin pellets.

2. The flow-guiding member unit according to claim 1, wherein a front edge of said vane portion is covered with a protective member.

3. The flow-guiding member unit according to claim 1, wherein said sheet-molding compounds comprise reinforced fibers comprising an average length of 60 mm or less, and a thermosetting resin or a thermoplastic resin.

4. The flow-guiding member unit according to claim 1, wherein said fiber-reinforced resin pellets comprise reinforced fibers comprising an average length of 60 mm or less and a thermoplastic resin, and wherein said reinforced fibers are oriented in one direction in said fiber-reinforced resin pellets.

5. The flow-guiding member unit according to claim 1, wherein said integral body member comprises a core member.

6. The flow-guiding member unit according to claim 1, wherein each of the protective fabrics comprises a woven or nonwoven fabric.

7. The flow-guiding member unit according to claim 6, wherein the woven or nonwoven fabric comprises at least one of: carbon fibers, glass fibers, or aramide fibers.

8. A method for producing a flow-guiding member unit comprising an integral body member comprising one vane portion, an outer platform portion, and an inner platform portion, wherein the flow-guiding member unit is used for assembling a flow-guiding member comprising a plurality of vanes, an outer platform, and an inner platform, the method comprising:

compressing one of sheet-molding compounds or fiber-reinforced resin pellets while heating in a molding die to form said integral body member comprising a protective fabric on each of two surfaces of the one vane portion, a step in said outer platform portions, and a step in said inner platform portion; and attaching an elastic member to the step in said outer platform portion and the step in said inner platform portion.

9. The method for producing a flow-guiding member unit according to claim 8, wherein said elastic member comprises a thermoplastic elastomer.

10. The method for producing a flow-guiding member unit according to claim 8, further comprising:

forming a protective member on a front edge of said vane portion.

11. The method for producing a flow-guiding member unit according to claim 8, wherein said compressing comprises placing a core member in said molding die such that the core member is surrounded by said sheet-molding compounds or said fiber-reinforced resin pellets.

12. The method for producing a flow-guiding member unit according to claim 8, wherein each of the protective fabrics comprises a woven or nonwoven fabric.

13. The method for producing a flow-guiding member unit according to claim 12, wherein the woven or nonwoven fabric comprises at least one of: carbon fibers, glass fibers, or aramide fibers.

* * * * *